United States Patent
Choudary et al.

Patent Number: 6,090,738
Date of Patent: Jul. 18, 2000

[54] PROCESS FOR THE PREPARATION OF A MOLECULAR SIEVE ADSORBENT FOR SELECTIVELY ADSORBING METHANE FROM A GASEOUS MIXTURE

[75] Inventors: Nettem Venkateshwarlu Choudary; Raksh Vir Jasra; Sodankoor Garadi Thirumaleshwar Bhat, all of Gujarat, India

[73] Assignee: Indian Petrochemical Corp. Ltd., Gujarat, India

[21] Appl. No.: 09/037,153

[22] Filed: Mar. 9, 1998

[30] Foreign Application Priority Data

Mar. 10, 1997 [IN] India ............................. 150/BOM/97

[51] Int. Cl.[7] ........................................................ B01J 29/04
[52] U.S. Cl. .................................. 502/62; 502/64; 502/65; 502/68; 502/73; 502/79; 95/128; 95/143; 95/902
[58] Field of Search ................................. 502/62, 64, 65, 502/68, 73, 79; 95/902, 128, 143

[56] References Cited

U.S. PATENT DOCUMENTS

| | | |
|---|---|---|
| 3,574,539 | 4/1971 | Domine et al. ............................. 23/112 |
| 4,259,299 | 3/1981 | Hagiwara et al. ....................... 423/210 |
| 4,631,267 | 12/1986 | Lachman et al. ........................ 502/439 |
| 4,793,827 | 12/1988 | Lochow et al. .............................. 44/65 |
| 4,822,492 | 4/1989 | Chao et al. .............................. 210/679 |
| 5,104,425 | 4/1992 | Rao et al. .................................... 55/16 |
| 5,190,902 | 3/1993 | Demmel .................................... 502/63 |
| 5,200,377 | 4/1993 | Zones et al. .............................. 502/62 |
| 5,202,014 | 4/1993 | Zones et al. .............................. 208/46 |
| 5,215,648 | 6/1993 | Zones et al. .............................. 208/46 |
| 5,387,564 | 2/1995 | Takeuchi et al .......................... 502/62 |
| 5,633,217 | 5/1997 | Lynn ....................................... 502/439 |
| 5,696,043 | 12/1997 | Tissler ...................................... 502/64 |

*Primary Examiner*—Tom Dunn
*Assistant Examiner*—Cam N. Nguyen
*Attorney, Agent, or Firm*—Ladas & Parry

[57] ABSTRACT

This invention relates to the manufacture of a molecular sieve adsorbent for selectively separating methane from its gaseous mixture with nitrogen. More particularly, the invention relates to the manufacture of novel molecular sieve adsorbents useful for the separation of methane-nitrogen gaseous mixture.

14 Claims, 3 Drawing Sheets

CHROMATOGRAM OF MIXTURE OF NITROGEN AND METHANE ON KZMP-1

RETENTION TIME/min

PROCESS FOR THE PREPARATION OF A MOLECULAR SIEVE ADSORBENT FOR SELECTIVELY ADSORBING METHANE FROM A GASEOUS MIXTURE

This invention relates to the manufacture of a molecular sieve adsorbent for selectively separating methane from its gaseous mixture with nitrogen. More particularly, the invention relates to the manufacture of novel molecular sieve adsorbents useful for the separation of methane-nitrogen gaseous mixture.

BACKGROUND OF THE INVENTION

The mixture of methane and nitrogen gases is found in a variety of situations and the mixture must be separated before using the individual component gases. For example, much of the natural gas resources are not readily usable due to high nitrogen (above 10% by volume) content as the commercially usable natural gas must have at least 90% methane gas. Furthermore, the nitrogen content of a reservoir increases with time the reservoir is in use. Methane-nitrogen mixture is also found in fire damp where 27–50% of methane is found. Separation of these gases is difficult due to closeness in their physical properties. At present, commercially this is achieved by energy intensive cryogenic techniques. The application of adsorption based separation of gases by pressure swing adsorption process is being increasingly used now. For example, separation of nitrogen and oxygen from air is in wide prevalence all over the world. Adsorption based processes can compete with highly energy intensive cryogenic separation of methane/nitrogen mixture if a suitable adsorbent which is selective towards one of the components and having adsorption capacity is commercially available.

Characteristics which are highly desirable, if not absolutely essential, for an adsorbent to be suitable for selective adsorption process include adsorption capacity of the adsorbent and adsorption selectivity for a particular component.

Adsorption capacity of the adsorbent is defined as the amount in terms of volume or weight of the desired component adsorbed per unit volume or weight of the adsorbent. The higher the adsorbent's capacity for the desired adsorbing component the better the adsorbent is as the increased adsorption capacity of a particular adsorbent helps to reduce the amount of adsorbent required to separate a specific amount of a component from a mixture of particular concentration. Such a reduction in adsorbent quantity in a specific adsorption process brings down the cost of a separation process.

Adsorption selectivity ($\alpha$) of component A over B is defined as

$$\alpha A/B = X_A \ Y_B/Y_A \ X_B$$

where X is the adsorbed concentration and Y is gas-phase concentration. The expression gas-phase concentration means the amount of unadsorbed component remaining in the gas-phase. The adsorption selectivity of a component depends on

- steric factors such as difference in the shape and size of the adsorbate molecules;
- equilibrium effect, i.e., when the adsorption isotherms of the components of the gas mixture differ appreciably;
- kinetic effect, when the components have substantially different adsorption rates.

It is generally observed that for a process to be commercially economical, the minimum acceptable adsorption selectivity for the desired component is about 3. Where the adsorption selectivity is less than 2, the separation process is not likely to be effective.

In the prior art, methane-selective adsorbent prepared by impregnating molybdenum oxide on activated carbon has been reported. Kinetic separation of methane/nitrogen mixture has also been examined using a naturally occurring zeolite clinoptilolite. The authors have earlier developed faujasite type zeolite based adsorbent for methane-nitrogen separation as disclosed in Indian Patent No. 437/Bom/95, dated Oct. 13, 1995.

The present invention deals with the development of methane selective adsorbents with a new chemical composition based on a different zeolite structure having enhanced adsorption capacity and high adsorption selectivity.

Zeolites which are microporous crystalline aluminosilicates are finding increased application as adsorbents for separating mixtures of closely related compounds. Zeolites have a three dimensional network of basic structural units consisting of $SiO_4$ and $AlO_4$ tetrahedra linked to each other by sharing of apical oxygen atoms. Silicon and aluminum atoms lie at the center of the tetrahedra. The resulting aluminosilicate structure which is generally highly porous possesses three dimensional pores the access to which is through molecular sized windows. In a hydrated form, the preferred zeolites are generally represented by the following Formula [I]

$$M_{2/n}O:Al_{n2}O_3:xSiO_2:wH_2O \tag{I}$$

where "M" is a cation which balances the electrovalence of the tetrahedra and is generally referred to as extra framework exchangeable cation, n represents the valency of the cation, x and w represent the moles of $SiO_2$ and water respectively. The cations may be any one of the number of cations which will hereinafter be described in detail.

The attributes which made them attractive for separation include, an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

Pentasil type zeolites as described and defined in U.S. Pat. No. 3,574,539 are the preferred adsorbents for adsorption separation of the gaseous mixture described in this invention. Zeolite of type mordentie in hydrated or partially hydrated form can be described in terms of the following metal oxide of Formula II

$$(0.9\pm 0.2)M_{2n}O:Al_2O_3:(5 \text{ to } 25)SiO_2:wH_2O \tag{II}$$

where "M" represents at least one cation having valence n, w represents the number of moles of water the value of which depends on the degree of hydration of the zeolite. Normally, the zeolite when synthesized has sodium as exchangeable cation.

Zeolites as such have very little cohesion and it is, therefore, necessary to use appropriate binders to produce the adsorbent in the form of particles such as extrudates, aggregates, spheres or granules to suit commercial applications. Zeolitic content of the adsorbent particles vary from 60 wt % to 98 wt % depending on the type of binder used. Clays such as bentonite, kaolin, or attapulgite are normally used inorganic binders for agglomeration of zeolite powders.

BRIEF SUMMARY OF THE INVENTION

It is therefore, an object of the present invention to provide an adsorbent which adsorbs methane selectively from its mixture with nitrogen.

Yet another object of this invention is to provide a methane selective adsorbent by modification of surface characteristics of synthetic zeolites.

Yet another object of the present invention is to provide an adsorbent with enhanced adsorption selectivity and capacity for methane from its mixture with nitrogen.

BRIEF DESCRIPTION OF THE FIGS.

DETAILED DESCRIPTION OF THE INVENTION

Figure 1:
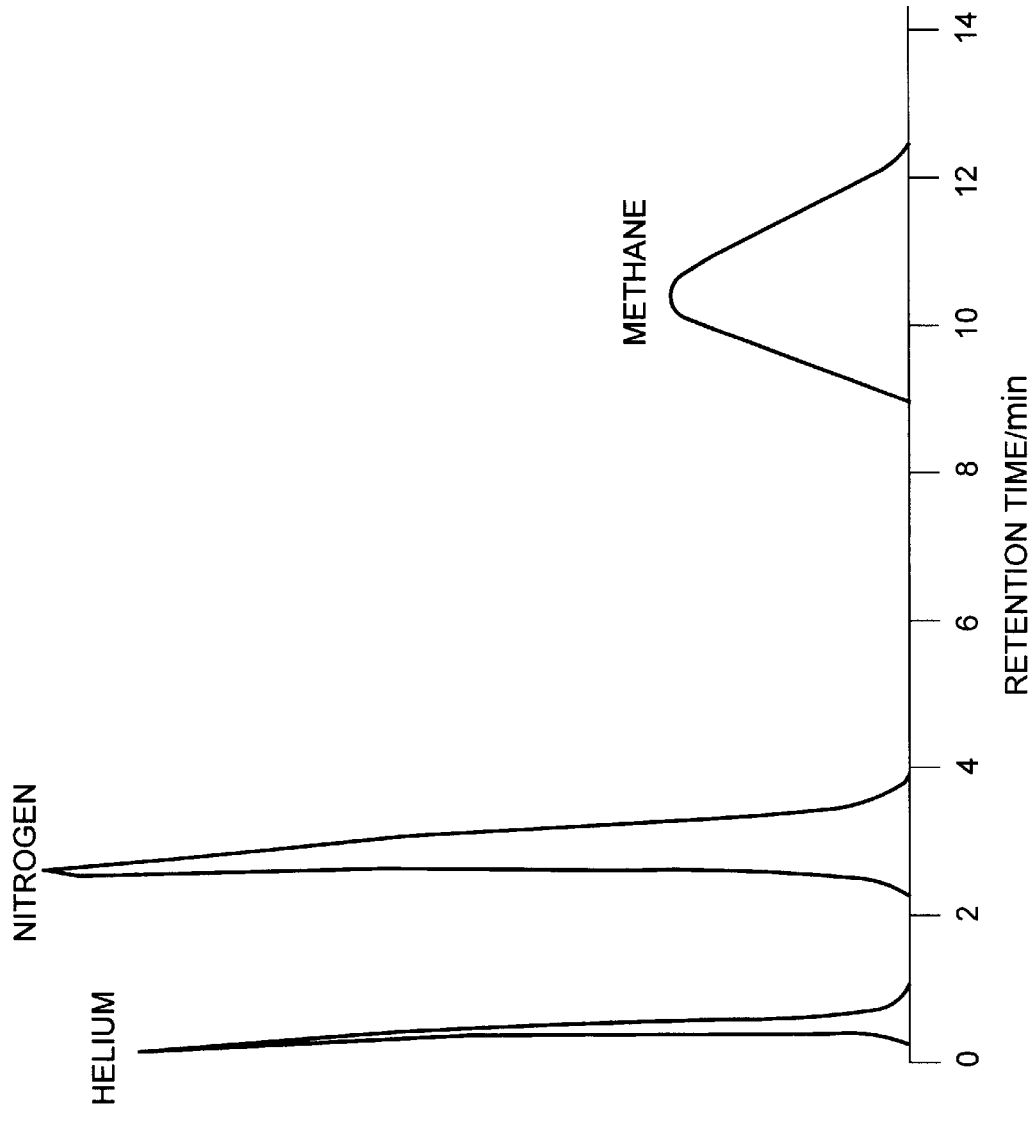
FIG. 1 is a chromatogram of mixture of nitrogen and methane on KZMP-1.

According to the present invention, there is provided a molecular sieve adsorbent having a chemical composition

$$Na_a \cdot M1_b \cdot M2_c \cdot Al_x \cdot Si_{48-x} \cdot O_{96} \cdot nH_2O$$

where the value of a is from 0.1 to 1, b and c are from 0 to 8 and x is from 2 to 8, M1 is potassium or cesium or a mixture thereof and M2 is a rare earth metal ion, and n represents the moles of water.

The starting material for the present invention is:

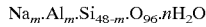

$$Na_m \cdot Al_m \cdot Si_{48-m} \cdot O_{96} \cdot nH_2O$$

where m is from 2 to 8 n is from 0 to 30 depending on the value of m and degree of hydration.

The initial zeolite, i.e., the starting material for the present invention may be prepared by any conventional method. Typically, the adsorbent of the present invention is obtained by (i) preparing a mixture of pentasil type zeolite powder as described in U.S. Pat. No. 3,574,539 with a clay such as herein described and an organic binder such as herein described, (ii) forming adsorbent bodies of desired shape or subjecting the adsorbent powder to cation exchange with one or more cations and then forming adsorbent bodies, (iii) subjecting the adsorbent bodies so formed to calcination, (iv) subjecting the calcined adsorbent bodies to cation exchange with one or more cations if the cation exchange has not been done in step (ii).

The present invention employs the techniques of modification of the surface properties of the adsorbent bodies by dealumination of the zeolite, cation exchange with one or more cations to obtain methane selective adsorbent from gaseous mixture of methane and nitrogen.

The modification of the surface property, hereinafter referred to as surface modification is the most critical and important aspect of the invention. It is a very specific surface modification which renders the zeolite particularly selective towards nitrogen. It has been surprisingly found that when a zeolite, for e.g., mordenite type is treated with an alkali salt solution, the resulting zeolite is highly methane selective.

Such surface modification treatment may be carried out either after calcination or after forming adsorbent bodies of desired shape. It is preferred that surface modification is carried out after calcination.

The most preferable aqueous solution employed for the surface modification is an alkali metal salt solution of potassium, cesium or both.

While the aforesaid surface modification may be carried out at a wide range of temperature and concentration, excellent results are obtained if the surface modification supply is carried out with 1 to 10% by weight of the aqueous solution at a temperature of 30 to 100° C. for 4 to 48 hrs.

The adsorbent bodies are prepared from a mixture of zeolite and inorganic clay powder with an addition of an organic binder like sodium lignosulfonate or starch or polyvinyl alcohol. Bentonite type clay preferably about 2 to 40% by weight is normally used for aggregation of zeolite powder. As the clay remains as an inert component in the adsorbent body and does not display any adsorption properties, the adsorption capacity and selectivity of the adsorbent body decreases in proportion to the amount of the clay added in the body.

Accordingly, the present invention provides a process for the preparation of a molecular sieve adsorbent for selectively adsorbing methane from a gaseous mixture consisting of methane and nitrogen, said process comprising:

(a) preparing in any known manner a mixture of zeolite powder with conventional clay and organic binder;

(b) shaping said zeolite mixture to obtain adsorbent bodies of desired shape;

(c) subjecting adsorbent bodies to calcination; and (d) subjecting said adsorbent bodies either prior to or after calcination or both, to cationic exchange in the presence of at least an alkali metal solution such as herein described to affect surface modification of said adsorbent bodies to obtain said molecular sieve adsorbent which is methane selective.

In a typical process for producing adsorbent pellets, zeolite powder of pentasil type or dealuminated zeolite of pentasil type was mixed with desired quantity of clay. A known quantity of an organic binder like sodium lignosulfonate was added to this mixture which was then subjected to ball milling for some specified period to have powder particles less than 60 microns. The powder thus obtained was formed into bodies using a pan granulator or an extruder. The particles prepared by the above described method were first dried in air at room temperature (28 to 32° C.) for about 6 to 12 hours followed by oven drying at 110° C. for 6 to 18 hours. The dried particles were subjected to air calcination at 500 to 750° C. for 2 to 12 hours followed by aforesaid surface modification step.

The particles were then dried at 110° C. in an air oven for 6 to 8 hours. The quantity of exchangeable cations in the adsorbent particles after the above treatment is determined by digesting the known amount of adsorbent particles in hot hydrochloric acid and then making the aqueous solution. The quantitative estimation of the cations in the aliquot solution is done by Atomic Adsorption Spectroscopic measurement.

The loss of crystallinity in the adsorbent particles, if any, was checked by comparing the X-ray diffraction data with literature X-ray data. The X-ray diffractions at the 'd/(A°)' values 13.7, 9.10, 6.61, 6.38, 6.10, 5.79, 5.03, 4.87, 4.53, 4.14, 4.00, 3.841, 3.76, 3.62, 3.56, 3.48, 3.39, 3.31 and 3.22 were used for comparison. Water adsorption capacity data on the above treated adsorbent particles were also compared with a standard zeolite of pentasil type. Water adsorption capacity was measured using a Mcbain-Baker quartz spring balance.

Methane/Nitrogen adsorption capacity and selectivity were measured by elution chromatography. In this technique, the adsorbent sample was ground and sieved to obtain 60–80 mesh particles and packed in a thoroughly cleaned 6×600 mm stainless steel column which was placed in an oven of a chromatograph. In those cases where starting material was zeolite powder, it was first pressed into pellets in a hydraulic press to obtain compact particles and then ground and sieved to obtain 60–80 mesh particles. The adsorbent was activated by subjecting it to a programmed heating from ambient to 400° C. at the heating rate of 2° C./minute and held at 400° C. for 12 hours with the flow of 60 ml/minute of ultra-high purity hydrogen. After the activation, the column temperature was brought down to ambient temperature and the hydrogen gas flow was reduced to 30 ml/minute. A 0.5 mL pulse of gas mixture consisting of methane, nitrogen and helium in hydrogen was injected in to the adsorbent column using a sampling valve, and the retention times of gases measured. The procedure was repeated at 40, 50 and 60° C. The column was equilibrated for at least 1 hour at each temperature before injecting the gas mixture. The corrected retention times were obtained by subtracting the helium retention time from those of methane and nitrogen.

The corrected retention time was used to determine the Henry constant (i.e. a measure of equilibrium adsorption capacity of an adsorbent for a particular component), adsorption selectivity and heats of adsorption for methane and nitrogen employing standard formulae described below:

Henry constant, $K/\text{mmol.g}^{-1}.\text{kPa}^{-1} = V_N/RT$ where R is gas constant having value of $8.31451 \text{ JK}^{-1}\text{mol}^{-1}$, T is the adsorbent column temperature in Kelvin and $V_N$ is the net retention volume per gram of adsorbent and is given by Net retention volume, $V_N/\text{cm}^3.\text{g}^{-1} = [Ft_Rj/(1-p_w/p_o)T/T_R]/W_s$ where F is carrier gas flow rate (ml/minute); $t_R$ is corrected retention time (minute); $p_w$ is water vapour pressure (kPa) at room temperature $T_R$, T is the adsorbent column temperature in Kelvin, $p_o$ is column out let pressure (kPa), $W_s$ is the active weight of the adsorbent present in the column and j is the compressibility correction given by the equation shown below Compressibility correction, $j = (3/2)[(p_i/p_o)^2 - 1)/p_i/p_o)]$ where $p_i$ and $p_o$ are the column inlet and outlet pressures respectively.

Adsorption selectivity, $\alpha CH_4/N_2 = V_N(CH_4)/V_N(N_2)$

Heat of adsorption, $-\Delta H_o = R \, d\ln(V_N/T)/d(1/T)$

In the formula $-\Delta H_o = R \, d\ln(V_N/T)/d(1/T)$ the letter 'd' represents the mathematical operation called 'differentiation' and ln presents 'natural logarithm'. This can be alternatively written as follows:

$$-\Delta H_O = R \frac{d}{d[1/T]}[\ln(V_N/T)]$$

In fact, $d\ln(V_N/T)/d(1/T)$ represents the slope of the straight line plotted with $1/T$ as x-axis and $V_N/T$ as y-axis. T, $V_N$ and R are defined elsewhere in this specification. The uncertainties in the values of $V_N$, $\alpha CH_4/N_2$ and $-\Delta H_o$ as calculated using the method of propagation of errors from the known errors in the experimental parameters were +0.8, +1.6 and +1.8% respectively.

The invention will now be illustrated with the help of the following examples. The results of the example i.e. the water equilibrium adsorption capacity value is shown in Table I. Table II discloses the adsorbent data for methane/nitrogen gaseous mixture on different adsorbents at 30° C.

Figure 2:
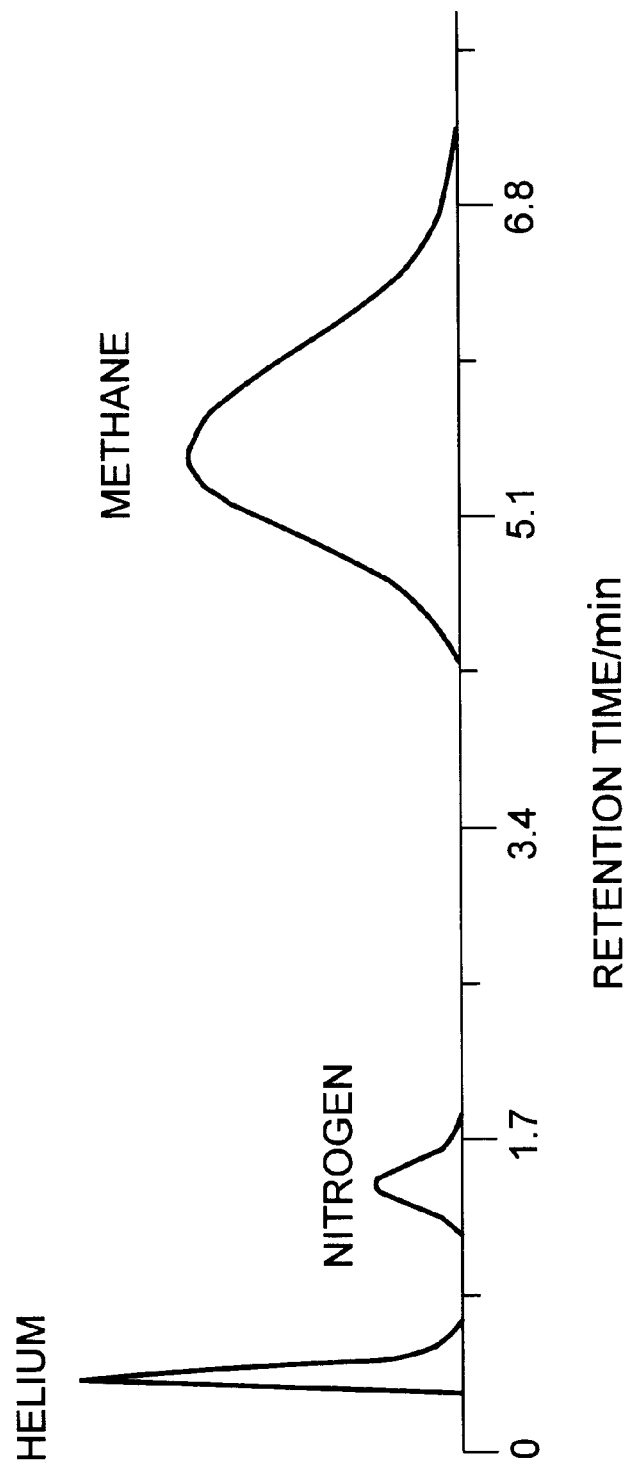
FIG. 2 is a chromatogram of mixture of nitrogen and methane on CSZMP-1.
Figure 3:
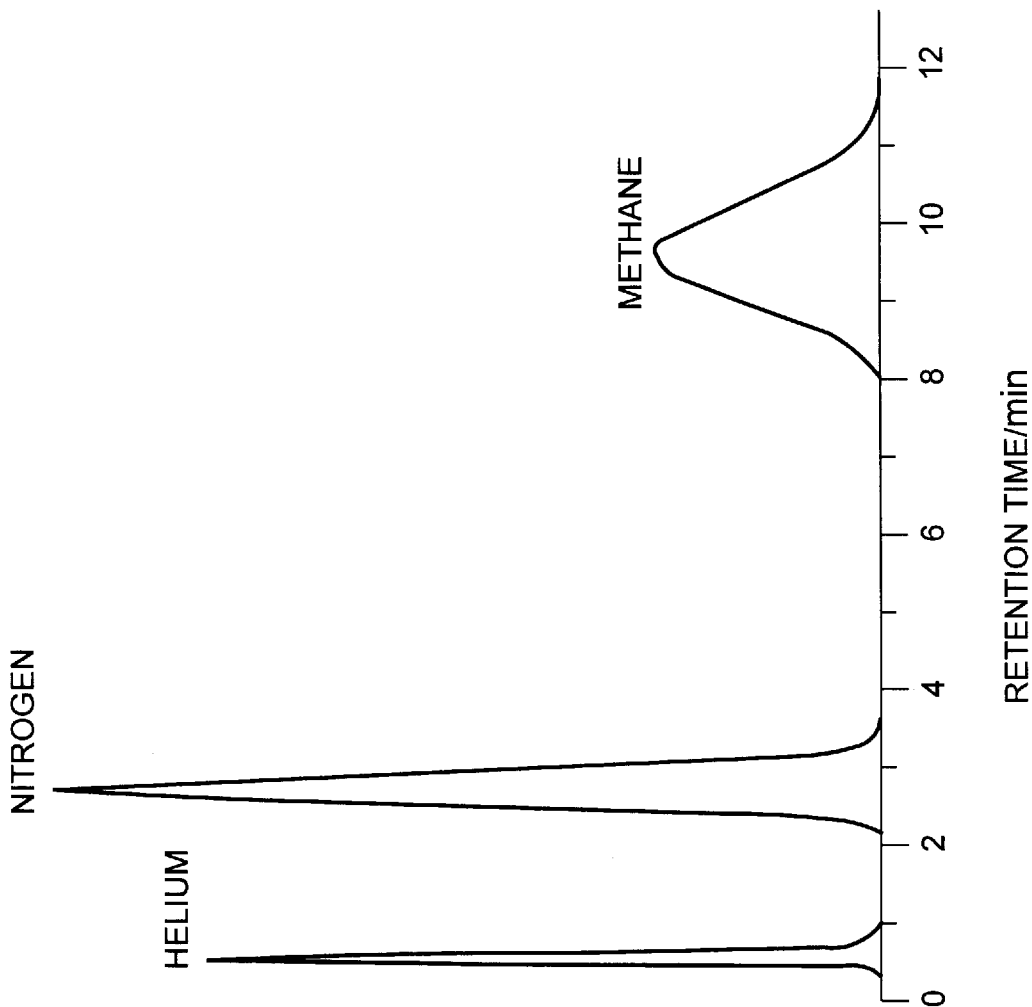
FIG. 3 is a chromatogram of mixture of nitrogen and methane on KZMP-5.

The final chromatogram of the nitrogen methane mixture eluted in the example herein are shown in the accompanying FIGS. 1–3.

It will be understood that the following examples are not intended to limit the scope of the invention. It is possible to work the invention outside the parameters specified without deviating from the scope and spirit thereof.

EXAMPLE 1

Pentasil type zeolite powder having chemical composition ($Na_8.Al_8.Si_{40}.O_{96}.nH_2O$) prepared by the method described in U.S. Pat. No. 3,574,539 was further repeatedly treated with 10% wt/wt aqueous solution of potassium chloride at 90° C. The solution was thereafter decanted and the adsorbent was washed with hot distilled water until the wash solution showed the absence of chloride. The adsorbent was then dried at 110° C. in an air oven. The zeolite structure was intact after potassium chloride treatment as all the x-ray diffractions present in pure zeolite are present. The water equilibrium adsorption capacity value is given in Table 1. The chromatogram of the mixture of nitrogen and methane eluted at 30° C. from the above adsorbent, KZMP-1 with a chemical composition of ($Na_{0.2}.K_{7.8}.Al_8.Si_{40}.O_{96}.nH_2O$) is shown in FIG. 1. The elution gas chromatography data of this adsorbent given in Table 2 show that adsorbent is methane selective with $\alpha CH_4/N_2$ of 3.5.

EXAMPLE 2

Pentasil type zeolite powder having chemical composition ($Na_8.Al_8.Si_{40}.O_{.96}.nH_2O$) prepared by the method described in example 1 above was further treated repeatedly with 2 wt % aqueous solution of cesium chloride solution. The solution was thereafter decanted and the adsorbent was washed with hot distilled water until the wash solution showed the absence of chloride. The adsorbent was then dried at 110° C. in an air oven. Water equilibrium adsorption capacity data given in Table 1 and the x-ray diffraction data show that the zeolite structure is intact after cesium chloride treatment. The elution gas chromatogram of the mixture of nitrogen and methane eluted at 30° C. from thus prepared adsorbent, CSZSMP-1, with a chemical composition of $Na_{0.1}.Cs_{7.9}.Al_8.Si_{40}.O_{96}.nH_2O$ is shown in FIG. 2. The adsorption data obtained from the retention data given in Table 2 show that the adsorbent is methane selective with $\alpha CH_4/N_2$ of 4.6.

EXAMPLE 3

200 g of pentasil type zeolite powder prepared by the method described in example 1 having a chemical composition of $Na_{0.3}.K_{7.7}Al_8.Si_{40}.O_{96}.nH_2O$ was mixed with 40 g of bentonite clay powder and 4 g of sodium lignosulfonate and hand pugged by adding water. The pugged mass was extruded though a 1.5 mm die by a hand extruder. The extruded adsorbent was first dried at room temperature followed by air oven drying at 110° C. Dried extrudates are calcined at 560° C. in a muffle furnace. Thus obtained adsorbent particles were evaluated for water adsorption (Table 1) and X-ray diffraction. The zeolite structure was intact after above treatment as all the diffractions present in pure zeolite X powder were present and the equilibrium water adsorption capacity only decreased in proportion to bentonite amount in the adsorbent. The adsorbent, KZME-1, thus prepared was further evaluated from Methane/Nitrogen adsorption capacity and selectivity by elution gas chromatography. The adsorption data given in Table 2 show that the adsorbent is methane selective with $\alpha CH_4/N_2$ of 3.4.

EXAMPLE 4

Pentasil type zeolite powder having chemical composition ($Na_8.Al_8.Si_{40}.O_{96}.nH_2O$) prepared by the method described in example 1 above was dealuminated by acid treatment to arrive at composition of $Na_{1.8}.Al_{4.4}.Si_{43.6}.O_{96}nH_2O$ as described in U.S. Pat. No. 4,237,329. This was further repeatedly treated with 5 wt % aqueous solution potassium chloride at 90° C. The solution was thereafter decanted and the adsorbent was washed with hot distilled water until the decanted solution showed the absence of chloride. The adsorbent was then dried at 110° C. in an air oven. As seen from the X-ray powder diffraction data and water adsorption (given Table 1), the zeolite structure was intact after potassium chloride treatment. The adsorbent, KZSMP-5, thus prepared had a chemical composition of $Na_{0.1}K_{1.7}.Al_{2.3}.Si_{45.7}O.nH_2O$. The elution gas chromatogram for the mixture of methane and nitrogen eluted from the above adsorbent at 30° C. is shown in FIG. 3. The adsorption data this adsorbent given in Table 2 show that adsorbent is methane selective with $\alpha CH_4/N_2$ of 4.0.

EXAMPLE 5

Pentasil type zeolite powder having chemical composition ($Na_8.Al_8.Si_{40}.O_{96}.nH_2O$) prepared by the method described in example 1 above was dealuminated by acid treatment to arrive at a composition of $Na_{1.8}.Al_{4.4}.Si_{43.6}.O_{96}.nH_2O$ as described in example-4. This was further repeatedly treated with 5 wt % aqueous solution cesium chloride at 95° C. The solution was thereafter decanted and the adsorbent was washed with hot distilled water until the decanted solution showed the absence of chloride. The adsorbent was then dried at 110° C. in an air oven. As seen from the X-ray powder diffraction data and water adsorption (given in Table 1), the zeolite structure is intact after cesium chloride treatment. The elution chromatogram of the mixtures of (a) helium and nitrogen and (b) helium and methane eluted at 30° C. from the above adsorbent, CSZMP-5, with a chemical composition of $Na_{0.1}Cs_{1.7}.Al_{2.3}.Si_{45.7}.O_{96}.nH_2O$ is given in Table 2. The selectivity data show that adsorbent is methane selective with $\alpha CH_4/N_2$ of 4.3.

EXAMPLE 6

Pentasil type zeolite powder having chemical composition (($Na_8.Al_8.Si_{40}.O_{96}.nH_2O$) prepared by the method described in example 1 above was further treated with 10 wt % aqueous solution of potassium chloride at 95° C. The solution was thereafter decanted and the adsorbent was washed with hot distilled water. The resultant adsorbent was further treated with 10 wt % aqueous cesium chloride solution. The solution was thereafter decanted and the adsorbent was washed with hot distilled water until the decanted solution showed the absence of chloride. The adsorbent was then dried at 110° C. in an air oven. As seen from the X-ray powder diffraction data and water adsorption (given in Table 1), the zeolite structure was intact after potassium and cesium chloride treatments. The adsorbent KCSZMO-1, thus prepared had a chemical composition of $Na_{0.2}.K_{3.6}.Cs_{3.4}.Al_8.Si_{40}.O_{96}.nH_2O$. The adsorption data of the above adsorbent given in Table 2 shows that adsorbent given in Table 2 shows that adsorbent is methane selective with $\alpha CH_4/N_2$ of 4.2.

EXAMPLE 7

Pentasil type zeolite powder having chemical composition ($Na_8,Al_8.Si_{40}.O_{96}.nH_2O$) prepared by the method described in example 1 above was further treated with 1 wt % aqueous solution of cerium (III) chloride at 95° C. The solution was thereafter decanted and the adsorbent was washed with hot distilled water until the decanted solution showed the absence of chloride. The adsorbent was then dried at 110° C. in an air oven. As seen from the X-ray powder diffraction data and water adsorption (given in Table 1), the zeolite structure was intact after cerium chloride treatments. The adsorbent, CEZMP-1, thus prepared had a chemical composition of $Na_{0.8}.Ce_{7.2}.Al_8.Si_{40}.O_{9.6}.nH_2O$. The adsorption data of the above adsorbent given in Table 2 shows that adsorbent is methane selective with $\alpha CH_4/N_2$ of 2.0.

TABLE 1

Equilibrium water adsorption capacity at 30° C. of various adsorbents

| Adsorbent | Example No. | Water adsorption capacity, g/100 g |
|---|---|---|
| KZMP-1 | Example-1 | 8.32 |
| CSZMP-1 | Example-2 | 7.08 |
| KZME-1 | Example-3 | 6.77 |
| KZMP-5 | Example-4 | 8.12 |
| CSZMP-5 | Example-5 | 6.17 |
| KCSZMP-1 | Example-6 | 7.32 |
| CEZMP-1 | Example-7 | 6.81 |

TABLE 2

Adsorption data for methane/nitrogen gaseous mixture on different adsorbents at 30° C.

| Adsorbent | Henry constant K/mmol · g$^{-1}$ kPa$^{-1}$ | | Adsorption Selectivity, | Heat of adsorption, kJ mol$^{-1}$ | |
|---|---|---|---|---|---|
| | CH$_4$ | N$_2$ | CH$_4$/N$_2$ | CH$_4$ | N$_2$ |
| KZMP-1 | 11.50 | 3.29 | 3.5 | 21.8 | 20.5 |
| CSZMP-1 | 7.96 | 1.73 | 4.6 | 22.4 | 19.3 |
| KZME-1 | 9.43 | 2.78 | 3.4 | 21.6 | 20.4 |
| KZMP-5 | 8.75 | 2.21 | 4.0 | 23.3 | 19.5 |
| CSZMP-5 | 7.51 | 1.74 | 4.3 | 21.1 | 17.4 |
| KCSZMP-1 | 10.04 | 2.39 | 4.2 | 22.0 | 18.9 |
| CEZMP-1 | 21.69 | 11.93 | 2.0 | 26.2 | 29.1 |

What is claimed is:

1. A process for preparing a molecular sieve adsorbent for selectively adsorbing methane from a gaseous mixture comprising methane and nitrogen, said process comprising:

(a) preparing a mixture of zeolite powder from a zeolite of the formula $$Na_mAl_mSi_{48-m}O_{96}nH_2O$$ 

where m is from 2 to 8, n is from 0 to 30, the value of n depends on the value of m and degree of hydration.

and, clay and an organic binder;

(b) shaping said zeolite mixture to obtain adsorbent bodies;

(c) subjecting said adsorbent bodies to calcination; and (d) subjecting said adsorbent bodies either prior to or after calcination or both, to cationic exchange in the presence of an alkali metal solution to affect surface modification of said adsorbent bodies to obtain said molecular sieve adsorbent of the formula $$Na_a.M1_b.M2_c.Al_x.Si_{48-x}.O_{96}.nH_2O$$

where the value of a is from 0.1 to 1, b and c are from 0 to 8 and x is from 2 to 8,

M1 is potassium or cesium or a mixture thereof and M2 is a rare earth metal ion, and n represents the moles of water.

2. The process as claimed in claim 1, wherein the alkali metal solution is a salt solution of potassium or cesium or a mixture thereof.

3. The process as claimed in claim 1, wherein said clay is bentonite clay.

4. The process as claimed in claim 1, wherein said clay is present in an amount of 2 to 40% by weight.

5. The process as claimed in claim 1, wherein said binder is selected from the group consisting of sodium lignosulfate, starch and polyvinyl alcohol.

6. The process as claimed in claim 1, wherein said zeolite mixture is subjected to ball milling to produce powders of particle size of less than 60 microns.

7. The process as claimed in claim 1, wherein the adsorbent bodies are dried at room temperature for about 6 to 12 hrs. followed by oven drying at a temperature of 110° C. for 6 to 18 hrs.

8. The process as claimed in claim 1, wherein said calcination is carried out at a temperature of 500 to 750° C.

9. The process as claimed in claim 1, wherein said calcination is carried out for a period of from 2 to 12 hrs.

10. The process as claimed in claim 1, wherein said cation exchange is carried out at a concentration of 1 to 10% by weight of the cation in aqueous solution.

11. The process as claimed in claim 10, wherein said cation exchange is carried out at a temperature of 30 to 100° C. for 4 to 48 hrs.

12. The process as claimed in claim 1 wherein said cation exchanged adsorbent bodies are thoroughly washed with hot water.

13. The process as claimed in claim 12, wherein the adsorbent bodies are oven dried at 110° C. for 6 to 8 hours.

14. A molecular sieve adsorbent of the formula $$Na_8.M1_b.M2_c.Al_x.Si_{48-x}.O_{96}.nH_2O$$

where the value of a is from 0.1 to 1, b and c are from 0 to 8 and x is from 2 to 8,

M1 is potassium or cesium or a mixture thereof and M2 is a rare earth metal ion, and n represents the moles of water which is methane selective.

* * * * *